May 28, 1946.   C. L. COOK   2,401,139

SUBSOILER

Filed March 30, 1944

INVENTOR.
CURTISS L. COOK
ATTORNEYS

Patented May 28, 1946

2,401,139

UNITED STATES PATENT OFFICE 2,401,139

SUBSOILER

Curtiss L. Cook, Syracuse, N. Y., assignor to Syracuse Chilled Plow Co., Inc., Syracuse, N. Y., a corporation of New York Application March 30, 1944, Serial No 528,779

11 Claims. (Cl. 97—183)

The present invention relates generally to agricultural implements and more particularly to soil working tools.

The object and general nature of the present invention is the provision of a new and improved subsoil plow or subsoil breaker especially adapted for general subsoil breakage but which is so constructed and arranged that the subsoiler point is releasable after contact with a stone or other obstruction in the ground. Heretofore, when operating with prior known subsoilers, if the same should happen to become engaged under a stone or other obstruction, it was frequently necessary to unhook the tractor and drive around to the rear of the subsoiler and hitch to the rear end thereof in order to pull the subsoiler away from the obstruction. The principal feature of the present invention lies in the provision of a subsoiler in which the subsoiler point is carried upon a shank that is pivoted to the frame or beam of the plow and normally held in operating position against rearward swinging by suitable latch means but in which provision is made for releasing the latch whenever necessary so that the point may swing rearwardly away from the obstruction upon the further advance of the tool in a normal forward direction. This eliminates any necessity for unhitching the tractor and driving around to the rear in order to pull the tool away from the obstruction.

Another feature of the present invention is the provision of an improved subsoil plow in which the plow beam is made up of a ground engaging member that lies along the surface of the ground substantially entirely from the front end of the beam to the portion thereof to which the shank is connected. This materially increases the shoe area that is in contact with the ground and makes it possible to employ a tool of this type in softer ground than has heretofore been thought practical. This particular construction not only provides decreased ground resistance but it therefore permits subsoiling in wet spots in fields which otherwise could not be worked without danger of the entire machine becoming mired.

It is an additional feature of the present invention to provide a subsoil plow or similar tool in which the tool itself can be released from the beam so as to permit passing over obstructions and the like and, in addition, to provide such a construction so arranged that the tool may be reset in operating position merely by backing the outfit.

These and other objects and advantages of the present invention will be apparent to those skilled in the art after a consideration of the following detailed description, taken in conjunction with the accompanying drawing in which the preferred form of the invention has been illustrated.

Figure 1:
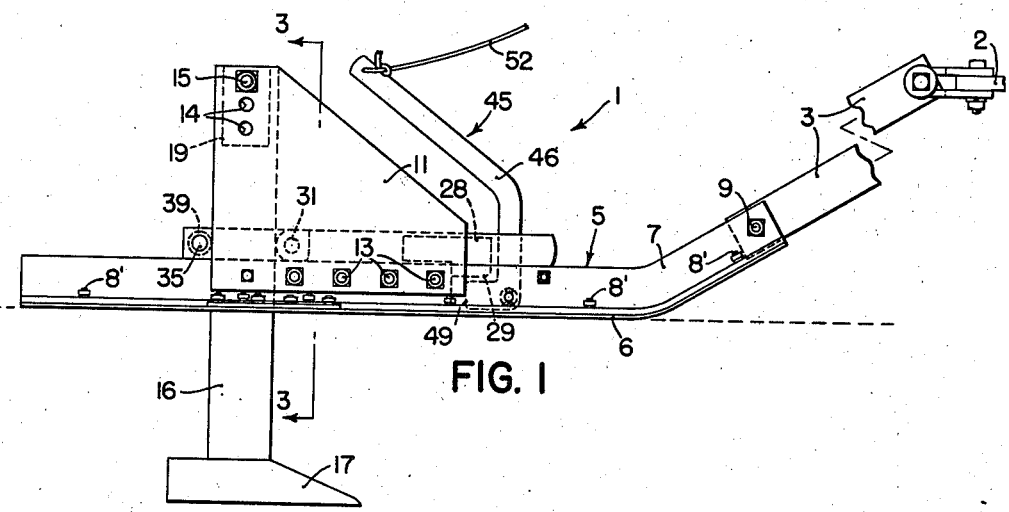
Figure 1 is a side view of a subsoil device in which the principles of the present invention have been incorporated.
Figure 2:
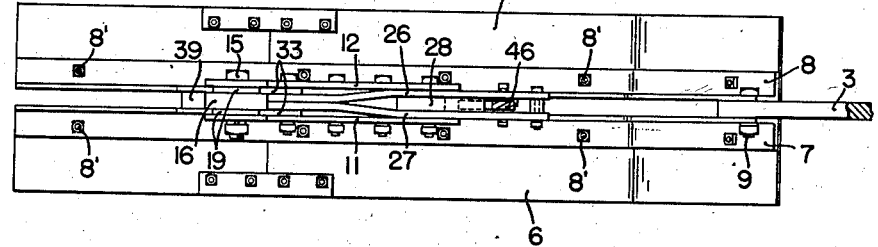
Figure 2 is a plan view of the implement shown in Figure 1.

Referring now more particularly to Figures 1 and 2, the subsoil device is indicated in its entirety by the reference numeral 1 and is adapted to be connected to a tractor 2 or other source of power by means of a draft bar 3. The beam of the plow 1 is indicated by the reference numeral 5 and comprises a ground engaging plate 6 extending entirely from the front end of the beam 5 to the rear end thereof, and a pair of angles 7 and 8 secured, as by bolts 8', to the ground engaging plate 6. The angles 7 and 8 and the ground engaging plate 6 are bent upwardly, as best shown in Figure 1, to provide a sled runner effect so as to facilitate the passage of the beam over the ground. The draft bar 3 is pivotally connected to the forward ends of the angles 7 and 8 by means of a draft bolt 9.

Figures 3, 4:
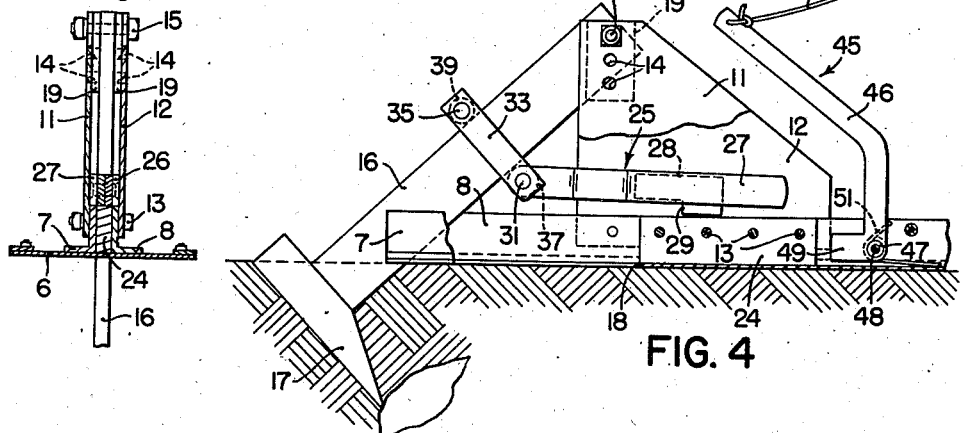
Figure 3 is a sectional view taken along the line 3—3 of Figure 1.
Figure 4 is a view similar to Figure 1, showing the action of the tool upon release to permit the tool to pass over an obstruction.

Secured to the rear portions of the angles 7 and 8 so as to form a part of the beam 5 is a pair of upwardly extending shank bracket plates 11 and 12. Preferably, the lower edges of the bracket plates 11 and 12 are bolted, as at 13, to the vertical flanges of the angles 7 and 8 and are disposed against the outer sides thereof, as best shown in Figure 3. The upper portions of the bracket plates 11 and 12 are reenforced by filler plates 19 and are provided with a plurality of holes 14 in any pair of which a bolt 15 may be disposed. The bolt 15 passes through an aperture in the upper end of a shank bar 16. The shank bar 16 carries a subsoiler point 17 at its lower end. The shank 16 extends downwardly between the bracket plates 11 and 12, between the rear end portions of the angles 7 and 8, and downwardly through a slot 18 in the rear end of the ground engaging plate 6. The tool 17 may, of course, be of any suitable construction, either a subsoil breaking point or a cylindrical or like member pointed at its forward end to form a drain or mole opening in the soil below the surface thereof.

Immediately forward of the shank 16 a spacer 24 is disposed between the angles 7 and 8, the spacer being apertured to receive attaching bolts, preferably the same bolts 13 by which the bracket plates 11 and 12 are fastened in place. A latch member 25, preferably consisting of a pair of latch straps 26 and 27, is formed with a nose or detent block 28 welded to the front ends of the straps 26 and 27, and the nose 29 of the block 28 is adapted to engage the front end of the spacer 24. The rear end portions of the straps 26 and 27 are bent so as to be disposed against one another at their rear ends. These ends are apertured to receive a pivot bolt 31 or the like which connects the latch member 25 to a second pair of straps 33 and 34 that are disposed on opposite sides of the shank and which are apertured to receive the bolt 31 and also a rear bolt 35 or the like at the rear edge of the subsoil shank 16. Preferably, the bolt 31 receives a bushing 37 so that the bolt 31 may be drawn up tight, as desired, without interfering with the pivot connection between the latch 25 and the attaching straps 33 and 34. Likewise, the bolt 35 may carry a bushing 39 which normally engages the rear edge of the shank 16, and the straps 33 and 34 may loosely embrace the shank 16 in various vertical positions relative thereto, depending upon the vertical adjustment of the shank 16 at its pivot 15. Thus, the straps 33 and 34, together with associated parts, constitute means by which the latch member 25 is pivotally connected with the shank 16 and which accommodates vertical adjustment of the shank relative to the beam. Any other suitable means may be employed for pivotally connecting the rear end of the latch 25 to the shank 16 so as to accommodate vertical adjustment of the latter relative to the frame 5 and also the rearward swinging of the tool 16, 17 (Figures 1 and 4).

In the event the point 17 hooks under a stone or other immovable or relatitvely immovable obstruction in the ground, provision is made, according to the present invention, for manually releasing the latch 25 from its engagement with the front end of the spacer 24. To this end I provide a trip lever indicated in its entirety by the reference numeral 45 and comprising a generally vertically and rearwardly extending bar 46 welded or otherwise secured at its lower end to a bushing 47 mounted on a pin 48 carried by the vertical flanges of the angles 7 and 8. Secured to or forming a part of the bushing 47 and/or the bar 46 is a rearwardly extending projection 49 adapted normally to underlie the nose portion 29 of the latch 25. The parts are so constructed that normally the projection 49 is held against the ground engaging plate 6, as by a coil spring 51. The upper end of the bar 46 is apertured to receive a cable 52 so that, when necessary, the lever 45 may be rocked forwardly, thus raising the projection 49 and disengaging the nose 29 from the spacer 24, whereupon the shank 16 and the point 17 are free to swing rearwardly about the pivot bolt 15. Since this rearward swinging movement also results in the upward shifting of the point 17, it will be seen that merely by releasing the shank from the beam, the implement may be automatically freed from obstructions that would otherwise require the tool to be pulled rearwardly away from the obstruction before proceeding farther. After the obstruction has been passed the shank 16 may be reconnected with the beam 1 merely by backing the outfit, whereupon the shank 16 will be swung downwardly and forwardly, relative to the frame, into a position in which the nose 29 will again engage the front end of the spacer 24, thus locking the shank in position for resumed normal operation. As shown, the latch 25 normally drops into engaged position under the action of gravity, but suitable spring means may be provided if desired to facilitate this action.

It is also important to note that by virtue of the ground engaging plate 6, the tool has extensive contact with the surface of the ground. In one preferred form of this invention the ground engaging shoe surface thus provided amounted to approximately 500 square inches. By supporting the tool with a surface of this extent, the tool of the present invention may be used where the ground is very soft and/or wet, yet the suck of the subsoiler point 17 and the stresses incident to the breaking of the subsoil and working of the same will not cause the beam or the tool to mire down, as is frequently encountered when using conventional subsoilers under adverse soil conditions, such as those just described.

While I have shown and described above the preferred structure in which the principles of the present invention have been incorporated, it is to be understood that my invention is not to be limited to the particular details shown and described, but that, in fact, widely different means may be employed in the practice of the broader aspects of my invention.

What I claim, therefore, and desire to secure by Letters Patent is:

1. A subsoil plow comprising a generally horizontal beam, a pair of bracket plates fixed to said beam and extending generally upwardly therefrom, a shank disposed between said plates and pivotally connected at its upper end thereto, said shank extending downwardly between said plates and below said beam, a point fixed to the lower end of said shank, a latch bar pivotally connected with said shank adjacent said beam and engageable with a portion of the latter for normally holding said shank against rearward movement, and a trip lever pivoted to said beam and engageable with said latch bar for disengaging it from said beam portion.

2. A subsoil plow comprising a generally longitudinally extending beam, said beam including a pair of angles, a pair of bracket plates secured to said angles and extending upwardly therefrom, a shank having a subsoiler point fixed thereto at its lower end, means pivotally connecting said shank to said bracket plates, a link connected at its rear end with said shank and extending forwardly along said beam, and means carried by said beam angles for releasably connecting the forward end of said link thereto.

3. A subsoil plow comprising a generally longitudinally extending beam, said beam including a pair of angles and a ground engaging plate to which said angles are secured, said plate having a slot at its rear end, a pair of bracket plates secured to said angles and extending upwardly therefrom, a shank pivoted at its upper end to the upper ends of said bracket plates and extending downwardly between the rear ends of said angles and through said slot, a soil working point fixed to the lower end of said shank, a spacer fixed to said angles between the latter and forward of said shank, and a latch pivoted to said shank and releasably engaging said spacer for holding the shank against rearward movement.

4. The invention set forth in claim 3, further characterized by a trip lever pivoted to said angles forward of said spacer and having a portion engageable with said latch for releasing it from said spacer upon movement of said trip lever.

5. The invention set forth in claim 3, further characterized by means pivotally connecting said latch to said shank, said means being vertically adjustable along said shank, and said shank being vertically adjustable with respect to said bracket plates, whereby the depth of operation of said point may be varied without effecting the release of the shank from said spacer by the operation of said trip lever.

6. A subsoil plow having a generally horizontally extending beam, a shank, means pivoting the upper end of said shank to said beam for rearward swinging movement, a ground working point fixed to the lower end of said shank, means associated with said pivoting means providing for vertical adjustment of said shank relative to said beam, latch means separate from said pivoting and adjusting means and acting between said shank and said beam for releasably holding the shank against rearward swinging, and means connecting said latch with said shank to accommodate vertical adjustment of the latter without changing the position of the latch relative to said beam.

7. A subsoil plow comprising a generally horizontally extending beam, a shank carrying a ground working point fixed to the lower end thereof, means pivotally connecting said shank with said beam in different vertical positions of the shank relative to the beam, a latch member comprising a longitudinally extending part pivotally connected at its rear end to said shank, and means on the beam for releasably connecting the forward end of said part thereto.

8. A subsoil plow comprising a generally horizontal beam, a pair of bracket plates fixed to said beam and extending generally upwardly therefrom, a shank disposed between said plates and pivotally connected at its upper end thereto, said shank extending downwardly between said plates and below said beam, a point fixed to the lower end of said shank, a latch bar pivotally connected with said shank and extending forwardly between said bracket plates, and means releasably connecting the forward end of said latch bar with the beam.

9. A subsoil plow comprising a generally longitudinally extending beam, said beam including a pair of angles and ground engaging means to which said angles are secured, a pair of bracket plates secured to said angles and extending upwardly therefrom, a shank pivoted at its upper end to the upper ends of said bracket plates and extending downwardly between the rear ends of said angles, a soil working point fixed to the lower end of said shank, a spacer fixed to said angles between the latter and forward of said shank, and a latch pivoted to said shank and releasably engaging said spacer for holding the shank against rearward movement.

10. A subsoil plow comprising a generally longitudinally extending beam, said beam including a pair of angles and ground engaging means to which said angles are secured, a pair of bracket plates secured to said angles and extending upwardly therefrom, a shank pivoted at its upper end to the upper ends of said bracket plates and extending downwardly between the rear ends of said angles, a soil working point fixed to the lower end of said shank, a latch pivoted to said shank, and a part fixed to said angles between the latter for releasably engaging the latch whereby the latter serves to hold said shank against rearward movement.

11. The invention set forth in claim 10, further characterized by a trip lever pivoted to said angles forward of said latch-receiving part and having a portion engageable with said latch for releasing it from said part upon movement of said trip lever.

CURTISS L. COOK.